US006727884B1

(12) United States Patent
Leatham et al.

(10) Patent No.: US 6,727,884 B1
(45) Date of Patent: Apr. 27, 2004

(54) SYSTEM AND METHOD FOR MAPPING INPUT DEVICE CONTROLS TO SOFTWARE ACTIONS

(75) Inventors: Scott R. Leatham, Duvall, WA (US); Om K. Sharma, Kirkland, WA (US); Marcus J. Andrews, Redmond, WA (US); James E. Veres, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/483,113

(22) Filed: Jan. 14, 2000

Related U.S. Application Data
(60) Provisional application No. 60/127,972, filed on Apr. 6, 1999.

(51) Int. Cl.[7] .............................. G09G 5/00; G09G 5/09; G06F 3/00; G06F 13/00
(52) U.S. Cl. ...................... 345/156; 345/161; 345/168; 463/36; 463/37; 463/38; 710/5; 710/62; 710/313
(58) Field of Search .............................. 463/38, 37, 36; 345/156, 157, 161, 172, 672, 676, 700, 965, 722; 711/100; 709/321; 710/129, 63

(56) References Cited

U.S. PATENT DOCUMENTS

| | | | | |
|---|---|---|---|---|
| 4,976,435 A | * | 12/1990 | Shatford et al. | 345/156 |
| 5,157,384 A | * | 10/1992 | Greanis | 345/156 |
| 5,317,695 A | | 5/1994 | Celi, Jr. | 395/275 |

(List continued on next page.)

FOREIGN PATENT DOCUMENTS

| | | |
|---|---|---|
| EP | 0 394 614 | 10/1990 |
| GB | 2 241 474 | 9/1991 |
| WO | WO 98/57719 | 12/1998 |

OTHER PUBLICATIONS

*Universal Serial Bus Specification*, Revision 1.1, Sep. 23, 1998, pp. ii, 4,6 and 19.

Apple Computer, Inc., Apple Game Sprockets Guide, 1996, Chapter 3, 3/5–3/68 (84 total pages).

*Primary Examiner*—Bipin Shalwala
*Assistant Examiner*—David L. Lewis
(74) *Attorney, Agent, or Firm*—Woodcock Washburn LLP

(57) ABSTRACT

A system for using computer input devices with software applications is disclosed. The system includes an input device mapper, which uses a language of semantics as an interface between input devices and software applications. The input device mapper receives information about which semantics the devices connected to the computer are able to implement, and which semantics correspond to actions that a user can request the software to perform. The input device mapper maps controls on the available devices into user-requestable software actions by matching, as closely as possible, device controls and software actions that correspond to the same semantic. An input device manager employing the disclosed input device mapper translates device operation events into the software's input dialect to direct the software to perform the action into which an operated control has been mapped. The system thus makes input devices and software applications transparent to each other, and permits a software application to be designed to operate without regard to which input device is being used to control its actions.

27 Claims, 7 Drawing Sheets

U.S. PATENT DOCUMENTS

| | | | | |
|---|---|---|---|---|
| 5,396,267 A | * | 3/1995 | Bouton | 345/168 |
| 5,442,376 A | | 8/1995 | Tannenbaum et al. | 345/156 |
| 5,807,175 A | | 9/1998 | Davis et al. | 463/36 |
| 5,838,307 A | | 11/1998 | Bouton | 345/168 |
| 5,893,064 A | * | 4/1999 | Kudirka et al. | 345/168 |
| 5,896,125 A | * | 4/1999 | Niedzwiecki | 345/168 |
| 5,935,224 A | | 8/1999 | Svancarek et al. | 710/63 |
| 5,991,546 A | | 11/1999 | Chan et al. | 395/882 |
| 6,071,194 A | * | 6/2000 | Sanderson et al. | 345/168 |
| 6,192,420 B1 | | 2/2001 | Tsai et al. | 710/10 |
| 6,223,289 B1 | | 4/2001 | Wall et al. | 713/201 |
| 6,263,392 B1 | | 7/2001 | McCauley | 710/129 |

* cited by examiner

FIGURE 4

A-S Correlation 231

| ACTION IN APPLICATION 36a | SEMANTIC |
|---|---|
| turn left or right | STEER |
| speed up | ACCELERATE |
| slow down | DECELERATE |
| change to next higher gear | SHIFT UP |
| fire machine guns | FIRE |
| change dash display | DASHBOARD |
| feedback | RUMBLE |
| . . . | . . . |

FIGURE 3

C-S Correlation 221

| CONTROL ON DEVICE 66 | SEMANTIC |
|---|---|
| Trigger 1 | FIRE |
| Button 1 | SHIFT UP |
| Steering Wheel | STEER |
| Right Pedal | ACCELERATE |
| Left Pedal | DECELERATE |
| Button 2 | TALK |
| Vibrate | RUMBLE |
| . . . | . . . |

SYSTEM AND METHOD FOR MAPPING INPUT DEVICE CONTROLS TO SOFTWARE ACTIONS

CROSS-REFERENCE TO RELATED APPLICATIONS

This application claims the benefit of U.S. Provisional Application No. 60/127,972, filed Apr. 6, 1999 and entitled "A System for Mapping Input-Device Functions to Software Application Input Commands."

TECHNICAL FIELD

This invention relates generally to the field of computer systems, and, more particularly, to the use of input devices with software applications.

BACKGROUND OF THE INVENTION

Various input devices are available to permit a computer user to communicate with a computer. A typical personal computer offers input devices such as a keyboard and a mouse. Numerous other devices are available, such as drawing pads, joysticks, and steering wheels (for use with driving games). These devices can be connected to a computer, and they permit the user to communicate information to the computer; the information communicated instructs software applications running on the computer to perform specified actions. Ideally, a computer user would be able to load a software application, connect an appropriate device to the computer, and the device and software would work together naturally. This ideal, however, has not been realized in prior systems.

In order for a device to work with a given software application, there must be a defined relationship between the controls on the device and actions that the software performs, but there are few standards governing the way in which this relationship is defined. Traditionally, software developers design software applications to support the most common devices and provide a device mapping control panel for those users who own other devices. This approach, however, has drawbacks: A software developer who wants to design an application to work well with many devices must know what controls are available on each device (e.g., buttons, levers, etc.) and how the device notifies the computer system of operational events (e.g., an input of 1001 signifies the pressing of a button). Additionally, the software developer must make design decisions as to which devices the software will support, and, on those devices that will be supported, how the controls will map to the actions that the software performs, which is a labor-intensive process for the software developer. Moreover, if a user owns an unsupported device, the user must generally resort to mapping the unsupported device manually by referring to generic pictures and tables in an application's manual and using the device mapping control panel provided with the application, which is a notoriously difficult process.

Some input device manufacturers address the problem of ensuring that specific applications work well with the device by supplying a software component with the device that dynamically reconfigures the device based on guesses as to what actions the application expects the device to support. Some manufacturers of devices with newer features provide filters to accommodate existing applications; frequently, these filters simulate keyboard presses or mouse movements for games that do not recognize enhanced features of the new device. Alternatively, some devices are supplied with mapping software that detects the presence of certain applications on the system and configures the device to work better with those applications. These ad hoc approaches, however, are error prone, may result in a relationship between device controls and software actions that feels unnatural to the user, and can only provide support for applications the device manufacturer knows about and chooses to support.

In view of the foregoing, there is a need for a system that overcomes the drawbacks of the prior art.

SUMMARY OF THE INVENTION

The system of the present invention includes an input device mapper, which links controls on input devices with actions that a software application performs. The input device mapper provides vocabularies of semantics, called "genres," where the semantics in each genre are appropriate for a particular category of applications, such as driving games or flight simulation games. For each input device, a correlation is provided to the input device mapper between the device's controls and semantics selected from a genre. Also, for each software application, a correlation is provided to the input device mapper between the application's actions and semantics selected from a genre. The input device mapper creates a mapping between device controls and software actions by identifying an input device that supports the software's genre and by connecting, as closely as possible, each control on the device with a software action that is correlated with the same semantic.

Game applications exemplify the system's use. For example, there may be a "driving game" genre. Each semantic in the driving game genre represents an abstract action that a driving game may be able to perform, such as "steer," "accelerate," and "decelerate." A steering wheel device may correlate the "steer" semantic with turning the steering wheel, and the "accelerate" and "decelerate" semantics with the right and left pedals. A driving game application may correlate the "steer," "accelerate," and "brake" semantics with the game actions of turning, speeding up, and slowing down, respectively. These correlations are provided to an input device mapper, which maps each device control into the game action associated with the same semantic. The input device mapper uses these correlations to map device controls into software actions; for example, the steering wheel maps to the action of turning the car, and the right and left pedals map to the actions of speeding up and slowing down the car.

The system may include several genres, where the different genres are appropriate for different types of applications. For example, in addition to the driving game genre described above, there could be a flight-simulation genre and a computer-aided design (CAD) genre. Devices may specify which genres they work well with and may provide a correlation between their controls and the semantics from each such genre. An application, on the other hand, can specify which genre the application falls into, or may specify various genres, representing different contexts within the application. For example, a game may start out in a driving game genre while a character drives to the location of a mission; later, the game may switch to a first-person fighter genre for when the character gets out of the car and moves around fighting targets.

The mapping created by the input device mapper may be used by an input device manager, which translates notification of device events (such as the pressing of a button on a joystick) into the application's input dialect while the application executes. Alternatively, the input device mapper may provide the mapping directly to the application, which then receives event notifications directly from the various input devices and uses the mapping to perform a particular action upon receiving notification of a corresponding device event, as specified in the mapping.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a block diagram showing a sample control-semantic correlation and its structure;

FIG. 4 is a block diagram showing a sample action-semantic correlation and its structure;

DETAILED DESCRIPTION OF THE INVENTION

Overview

The variety of software applications and input devices available gives consumers increasingly large choices as to the applications and devices to use with a computer. This variety comes at the expense of compatibility, as not all applications and devices are configured to work together. Ideally, a computer user should be able to load an application, such as a game, connect an appropriate input device, and have the application and device work together in a manner that feels natural to the user, thus allowing true "plug and play" capability.

Computer Environment

Figure 1:
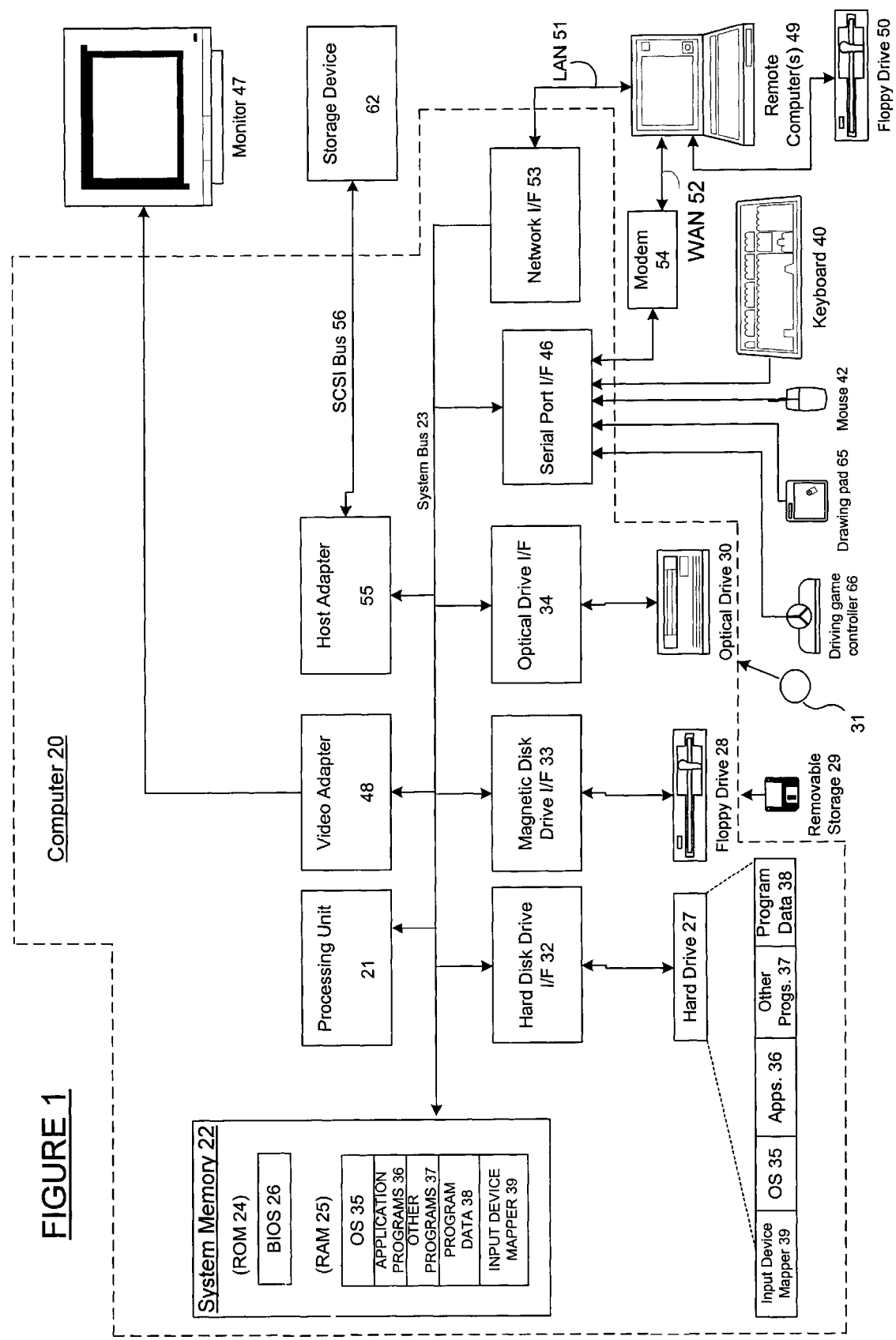
FIG. 1 is a block diagram representing a computer system in which aspects of the invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and an input device mapper 39. A user may enter commands and information into the personal computer 20 through input devices such as a keyboard 40, a pointing device 42, a drawing pad 65, or a game controller such as driving game controller 66. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Input Device Mapper

Figure 2:
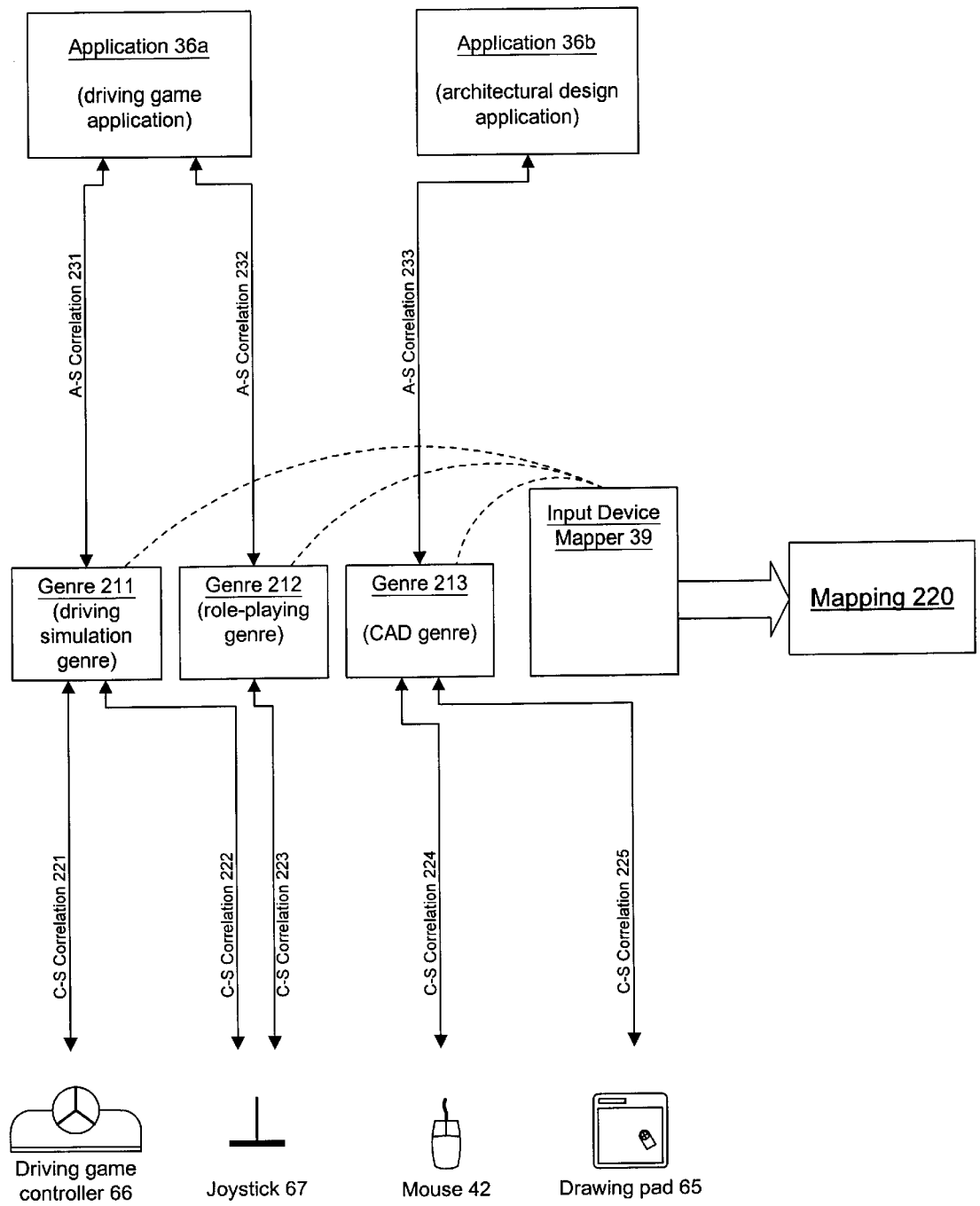
FIG. 2 is a block diagram showing the use of an input device mapper with input devices and software applications.

FIG. 2 depicts the use of an input device manager in accordance with the invention. Input device mapper 39 is a software module that provides an interface between application programs 36 and input devices, such as devices 42, 65, 66, and 67. Input device mapper 39 could be a component of an operating system running on computer 20, such as operating system 35, or a stand-alone software module, as shown in FIG. 2.

Input device mapper 39 is associated with several genres, such as genres 211–213. A genre is a semantic vocabulary that encapsulates the common input elements among applications falling into a broad category. A semantic is a label that expresses a behavior that an application exhibits upon operation of a control. Input device mapper 39 is associated with at least one genre; preferably, input device mapper 39 is associated with several genres. The genres associated with an input device mapper may be publicized so that input device manufacturers and software developers can use input device mapper 39 in the manner described below to allow devices and software to work together.

In FIG. 2, genre 211 is an example driving game genre (corresponding to example genre 1 in the Examples section below), genre 212 is an example role playing genre (corresponding to example genre 3 in the Examples section below), and genre 213 is an example computer-aided design (CAD) genre (corresponding to example genre 8 in the Examples section below). Input devices 65, 66, 67, and 42 provide input device mapper 39 with correlations between their controls and the semantics of genres 211–213, called "control-semantic" correlations 221–225 (abbreviated "C-S correlation"). C-S correlation 221, which is shown in detail in FIG. 3, correlates the controls on driving game controller 66 with semantics chosen from driving simulation genre 211. Joystick 67 is appropriate for use with both driving simulation applications and role playing applications. Therefore, joystick 67 provides two different C-S correlations; C-S correlation 222 provides a link to the controls on joystick 67 with driving simulation genre 211, and C-S correlation 223 provides a link to the controls on joystick 67 with role playing genre 212. Mouse 42 and drawing pad 65 provide C-S correlations 224 and 225, respectively, between their controls and CAD genre 213. A device may provide additional C-S correlations for specific purposes. For example, the manufacturer of driving game controller 66 may provide C-S correlation 221 which is appropriate for the driving simulation genre generally, but may also provide additional C-S correlations (not shown), which refine C-S correlation 221 for use with particular driving games. Each C-S correlation may specify the applications (e.g., the "XYZ" driving game) or classes of application (e.g., all applications in a driving simulation genre) with which it may be used. Applications 36a and 36b provide input device mapper 39 with correlations between actions that they perform and genres 211–213, called "action-semantic" correlations 231–233 (abbreviated "A-S correlation"). Driving game application 36a provides A-S correlation 231, which is shown in detail in FIG. 4, between its actions and semantics selected from driving simulation genre 211. Architectural design application 36b provides an A-S correlation between its actions and CAD genre 213. In addition to A-S correlation 231, driving game application 36a also provides A-S correlation 232 between its actions and role playing genre 212. Providing two different A-S correlations for a single application is appropriate when the application has two different phases that require different usage of the controls. For example, in driving game application 36a, the character begins by driving a car; this phase of the game is in driving simulation genre 211. Later, the character gets out of the car and explores on foot; this phase is in the role playing genre 212.

Input device mapper 39 receives C-S correlations 221–225 and A-S correlations 231–233. Input device mapper 39 creates a mapping for each application program 36a, 36b, on computer 20. For example, in order to create mapping 220 for driving game application 36a, input device mapper 39 first selects an appropriate device for the driving game genre, by determining which devices have a C-S correlation for the driving simulation genre. If there is more than one device having a C-S correlation for driving simulation genre 211, such as driving game controller 66 and joystick 67, then input device mapper 39 selects one of these devices. The selection may be made in various ways, for example by selecting the first appropriate connected device that input device mapper 39 locates, or by consulting a database of preferred devices for each genre. For example, input device mapper 39 selects game controller 66 because it is the first device that it locates which supports driving simulation genre 211. Once the device is selected, input device mapper 39 uses C-S correlation 221 and A-S correlation 231 to map controls on game controller 66 into actions that driving game application 36a performs. Input device mapper 39 may create the mapping by performing a simple matching (i.e., by referring to C-S correlation 221 and A-S correlation 231 and linking each control with an action that is correlated with the same semantic), or it may take into account user preferences or overrides, as discussed below in the text accompanying FIG. 6.

Input device mapper may create a second mapping (not shown) for a different phase of an application that requires controls to be used in a different context, such as the role-playing phase of driving simulation game 36a. That mapping is created by selecting an appropriate device for the role-playing genre, such as joystick 67, and using C-S correlation 223 and A-S correlation 232 to map the controls on joystick 67 into the actions for the role-playing phase of game application 36a. Some applications change context frequently, such as a baseball game application, where the context of the controls is different for pitching than it is for batting. Preferably, these different contexts may be supported by a single genre; for example, the baseball genre shown below (example genre 6 in the Examples section) has different semantics for batting, pitching, and fielding.

FIG. 3 depicts the detail of sample C-S correlation 221. Controls 301 represent controls on driving game controller 66. Semantics 302 are semantics chosen from driving simulation genre 211. C-S correlation 221 links controls 301 with semantics 302. In the example depicted by FIG. 3, "Trigger 1" on game controller 66 is associated with the semantic "FIRE", "Button 1" is associated with the semantic "SHIFT UP", etc.

FIG. 4 depicts the detail of sample A-S correlation 231. Actions 401 represent actions that driving game application program 236 can perform at the user's request. Semantics 402 are semantics chosen from driving simulation genre 211. In the example depicted by FIG. 4, the action performed by the driving game described as "turn left or right" is associated with the semantic "STEER", "speed up" is associated with the semantic "ACCELERATE", etc.

Figure 5:
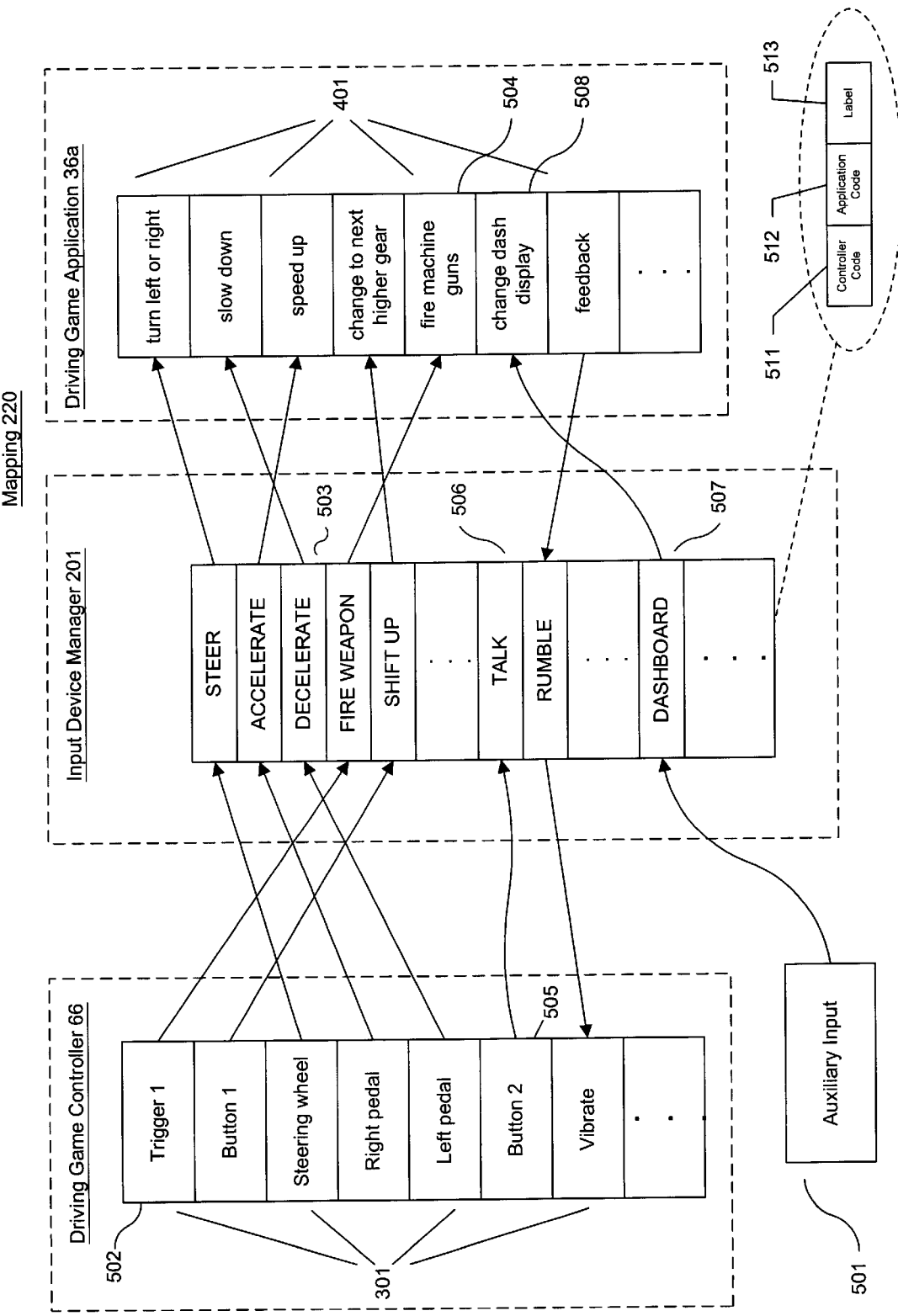
FIG. 5 is a block diagram showing a sample mapping created by an input device mapper in accordance with aspects of the invention.

FIG. 5 depicts a sample mapping 220 created by input device mapper 39, which links the controls on game controller 66 with actions performed by driving game application 36a. Controls 301 are correlated with semantics, as defined in C-S correlation 221. The semantics are correlated with software actions 401, as defined in A-S correlation 231. In the example, "trigger 1" 502 on game controller 66 is correlated with the semantic "FIRE" 503, which, in turn, is correlated with the software action "fire machine guns" 504.

The detail of an entry in the mapping is shown in items 511–513. Each entry contains a controller code 511, an application code 512, and a label 513. The controller code 511 is the data that an input device generates when a particular control has been operated. For example, game controller could signify that trigger 1 has been pressed by generating the number "1002." The application code 512 is the item of input that an application expects to receive as an instruction to perform a particular action. For example, the input "64379" could instruct driving game application 36a to fire machine guns. Label 513 is a text string provided by application program 36a, which is a plain language description of the action that application program 36a will perform upon receiving application code 512 as its input. For example, "fire machine guns" is a label describing the action that will be performed by driving game application 36a when trigger 1 is depressed. The labels are helpful for displaying a graphic representation of the mapping, as described below in the text accompanying FIG. 6.

A mapping could be bi-directional. For example, it will be observed that mapping 220 shows a software action "feedback" 509 mapped into the "vibrate" control 511 on game controller 66 through the semantic "RUMBLE" 510. A genre, such as driving simulation genre 211, may contain semantics such as "RUMBLE," which represent functions that the device is able to perform at the request of an application. The direction of the arrows indicates that "feedback" is a command that driving game application 36a issues to game controller 66. For example, game controller 66 may be equipped with a mechanical device that vibrates the game controller, and driving game application 36a may wish to provide feedback to the game player in response to certain events, such as a car crash. In this case, driving game application 36a includes a feedback-RUMBLE link in A-S correlation 231. Similarly, driving game controller 66 includes a vibrate-RUMBLE link in C-S correlation 221. Input device mapper 39 links "feedback" to "vibrate" in mapping 220.

FIG. 5 also shows a control labeled "button 2" 505 on game controller 66, which is correlated with the semantic "TALK" 506, which might be appropriate for the action of operating a two-way radio to talk with other drivers. This correlation means that button 2 would be mapped to an action correlated with the "TALK" semantic in an application that has such an action. Driving game application 36a, however, does not have an action correlated with the "TALK" semantic; therefore, button 2 on game controller 66 does not map to any action in driving game application 36a.

It will also be observed in FIG. 5 that mapping 220 uses a semantic "DASHBOARD" 507, which is correlated with the action in driving game application 36a of changing the dash display, and it will also be observed that game controller 66 does not have a control correlated with the "DASHBOARD" semantic. A feature of input device mapper 39 is that it provides an application with the model that all of the defined semantics in a genre are supported in any computer system on which the application may be running, such as computer 20. For example, even though game controller 66 does not have a control correlated with the "DASHBOARD" semantic, driving game 36a may still correlate its "change dash display" action with the semantic "DASHBOARD," and input device mapper 39 will locate an appropriate auxiliary input for that action. In mapping 220, auxiliary input 501 is selected by input device mapper 39 to implement the "DASHBOARD" semantic. Auxiliary input 501 may be a key on keyboard 40, an unused control on game controller 66 such as control 505, a pop-up menu that the user can control with pointing device 42, or any other mechanism by which the user can communicate with computer 20.

The genres may be defined such that some semantics must be mapped to the primary input device selected by input device mapper 39 and may not be mapped to an auxiliary input outside of that device. For example, in the genres provided below in the Examples section, controls are divided into the categories "priority 1" and "priority 2." A priority 1 control is a control that must be implemented on the primary input device and may not be implemented by an auxiliary input. A priority 2 control is a control that may be implemented on the primary input device, if a control is available. For example, in the genre "driving sim without weapons" shown in below in the Examples section, steering is a priority 1 control, so the "steer" semantic must be implemented on the primary input device selected by input device mapper 39, such as game controller 66. However, "dashboard" is a priority 2 control, so it may be implemented by any type of auxiliary input. Some other controls, which may be designated as "priority 3," are never implemented by the device used for the mapping, and therefore the genres do not define semantics to correlate with these controls. For example, a game application may provide a pop-up menu to change the background color of the screen, select the background music accompanying the game, select weapons to be carried, etc. Because no semantics are defined for priority 3 functions, they are implemented by the application directly rather than through input device mapper 39.

Figure 6:
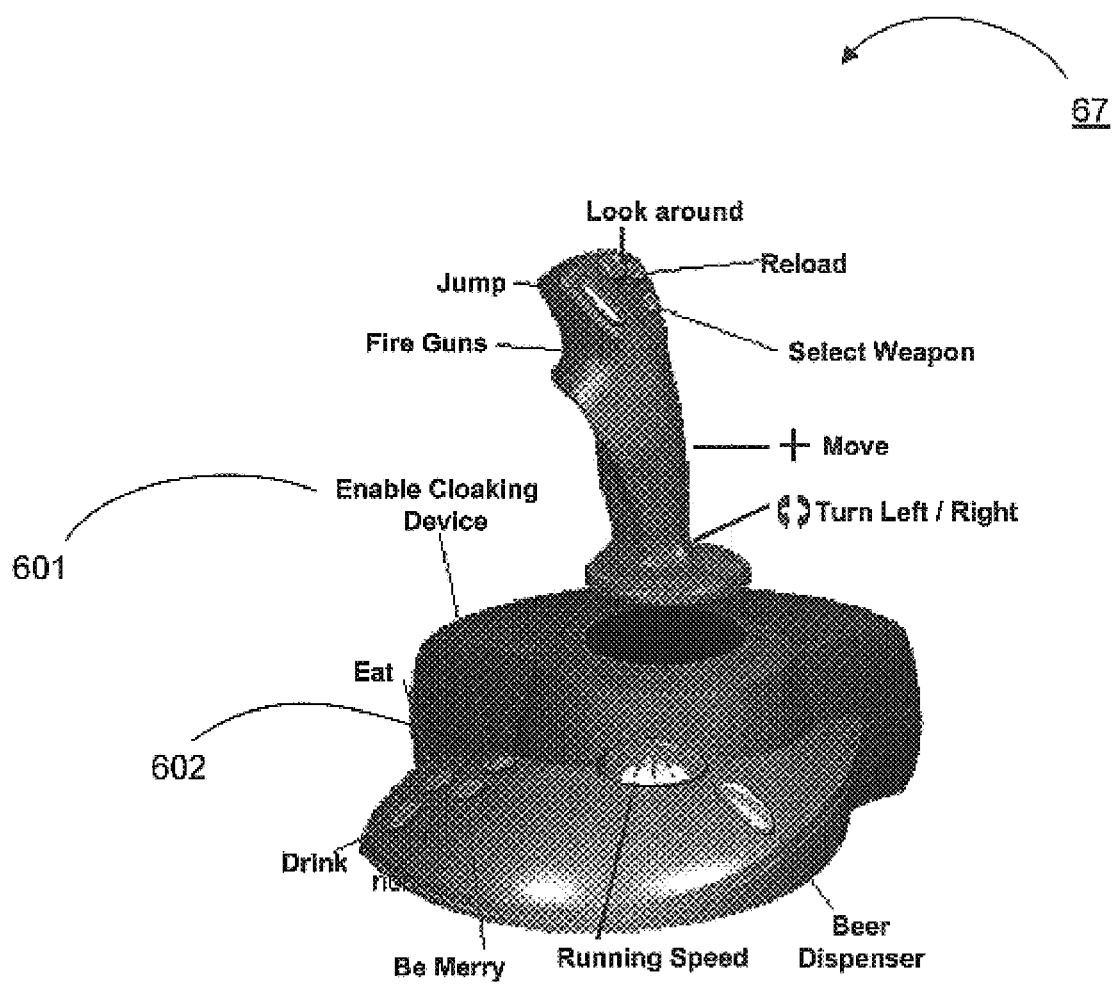
FIG. 6 is an image of an input device with action labels, as displayed by an input device mapper in accordance with aspects of the invention.

It is also possible for a user to affect a mapping created by input device mapper 39, either by providing a set of preferences for input device mapper 39 to take into account in creating the mapping, or by modifying a mapping after it has been created. For example, a user may create a set of preferences specifying that button 1 on game controller 66 should always map to the semantic "HONK_HORN" in every application falling into a driving simulation genre. A user may also modify a mapping that has been created: Input device mapper 39 may provide the user with a display showing the device controls that have been mapped to particular software actions, and may permit the user to change the mapping. FIG. 6 depicts such a display, as might appear for joystick 67. The manufacturer of joystick 67 may provide a bitmap image or 3D model of the device, with blank text fields that are filled in with data from the application. The data is provided by the application as part of the A-S correlation in the form of text strings; the application may provide a text string label for each action, and the labels may be displayed with an image of the device. For example, text field 601 is filled in with the text "enable cloaking device," which indicates that button 602 is mapped to a cloaking device action in the game application. This text string was provided to input device mapper 39 in an A-S correlation and becomes part of the mapping, as depicted in elements 511–513 in FIG. 5. The user can create a custom mapping, for example by using a mouse 42 to rearrange the labels on the displayed image of the device. If the user creates a custom mapping, input device mapper 39 may interpret the user's changes as the expression of a set of preferences. For example, if a user uses the display depicted in FIG. 6 to modify the mapping of joystick 67 into the actions for a game in the first-person genre, input device mapper 39 may interpret the user's choice as a general preference that joystick 67 should work similarly with all games in first-person genres (i.e., that button 602 should enable a cloaking device in any first-person game that offers a cloaking device). The user's preferences may be stored in a file or database for future use by the user. Additionally, storing the preferences in a file or database permits the preferences to be easily ported from computer 20 to any other machine on which input device mapper 39 has been implemented, thus permitting consistent mappings across several machines.

Use of the Input Device Mapper

Figure 7:
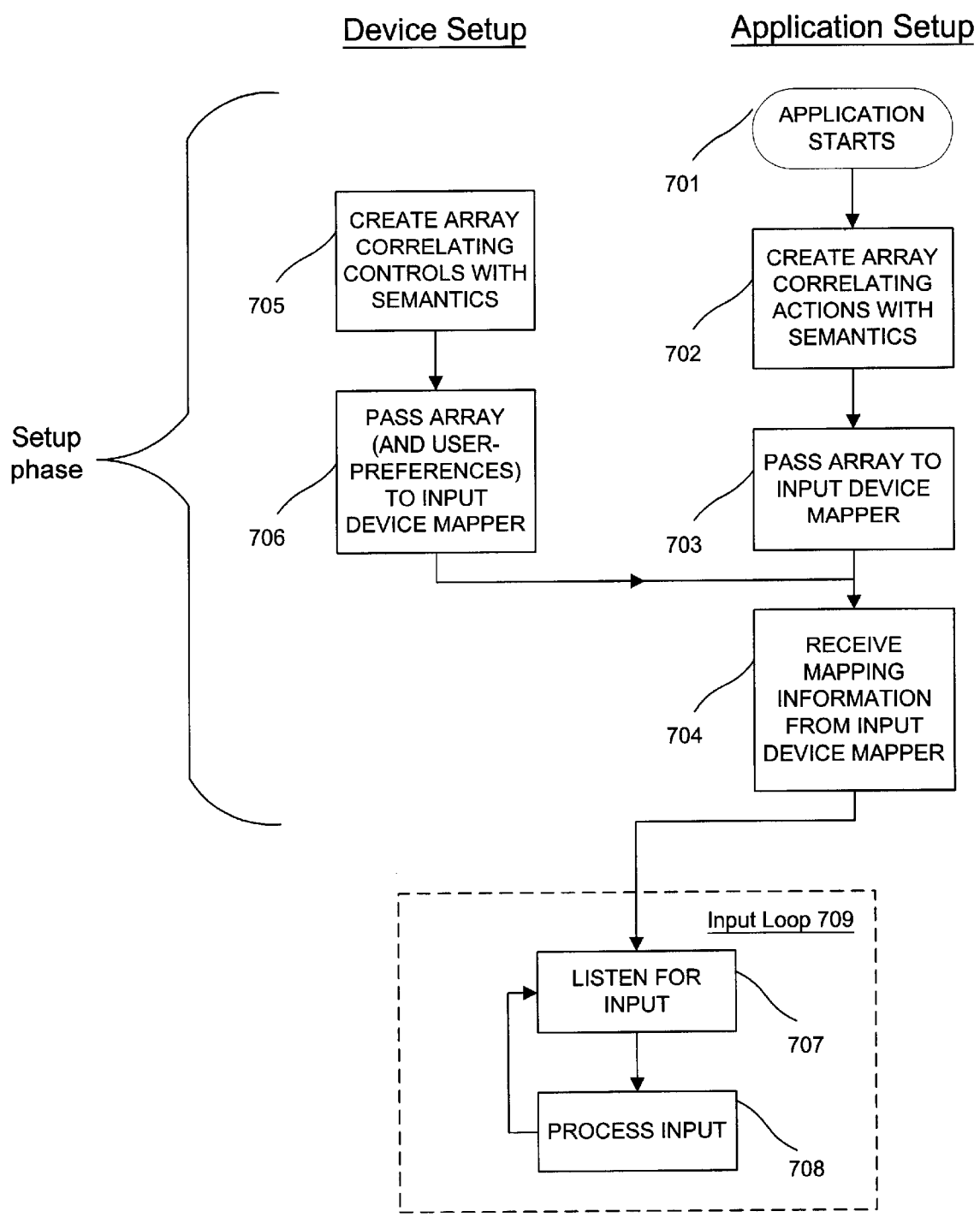
FIG. 7 is a flowchart illustrating the process by which an input device mapper is used in accordance with aspects of the invention.

FIG. 7 is a flowchart showing an example use of an input device mapper in accordance with the present invention, and the steps to initiate its use. As shown in FIG. 6 and described in detail below, a device and an application both undergo a setup phase, in which they pass their respective C-S and A-S correlations to an input device mapper; the application program then receives and processes input in accordance with the mapping.

Steps 701 through 704 relate to the setup of an application program for use with input device mapper 39. An application program, such as driving game application 36*a*, begins execution at step 701. At step 702, the application creates an array correlating actions with semantics. For example, application 36*a* could create an array representing A-S correlation 231. The array created at step 702 is passed to input device mapper 39 at step 703.

One method of representing A-S correlation 231 in the array created as step 702 is to assign a unique value to each action and to each semantic. For example, the semantics in genre 211, which are used in A-S correlation 231 and C-S correlation 221, may be assigned unique values as follows: 1 represents "STEER", 2 represents "ACCELERATE", etc. In a programming environment that supports symbolic constants, such as C++, it is convenient to represent the values as symbols. Input device mapper 39 may define the set of available genres and assign symbolic constants to each semantic, which may be exported to users of input device mapper 39 in a header file. Similarly, unique values may be assigned to each action that application program 36*a* performs, which may also be represented by symbolic constants in an appropriate programming environment. The array created at step 702 then contains a sequence of ordered tuples, where each tuple includes, in a defined order, a value representing an action performed by the application, and a value representing a semantic correlated with that action.

Steps 705 and 706, which relate to the setup of a device for use with an input device mapper in accordance with the invention, take place asynchronously with respect to steps 701, 702, and 703. For an input device connected to computer 20, an array is created at step 705 correlating the controls on the device with semantics from a particular genre. For example, an array may be created representing C-S correlation 221, which correlates the controls on device 66 with semantics chosen from genre 211. The C-S correlation may be represented in an array in a manner analogous to that used to represent an A-S correlation, as described above: unique values are associated with each control, and an array is constructed to contain a sequence of ordered tuples, where each tuple includes, in a defined order, a value representing a control and a value representing a semantic correlated with the control. When multiple C-S correlations exist for a given device, they may be represented in multiple arrays. The array(s) created at step 705 is (are) passed to input device mapper 39 at step 706. Optionally, any user preferences that have been specified may also be passed to input device mapper 39 in an appropriate format at step 706.

The creation of the array at step 705 may take place long before application 36*a* begins executing, or at any time prior to steps 704 and 706. For example, the supplier of game controller 66 may create C-S correlation 221 at the time game controller 66 is designed, and supply an array representing C-S correlation 221 along with game controller 66 on a medium such as magnetic disk 29 or optical disk 31; this array can then be passed to input device mapper 39 at step 706 by loading it into computer 20 through magnetic drive 28 or optical drive 30. Alternatively, game controller 66 may be known to the designer of input device mapper 39, in which case the array may be built into input device mapper 39.

Figure 8:
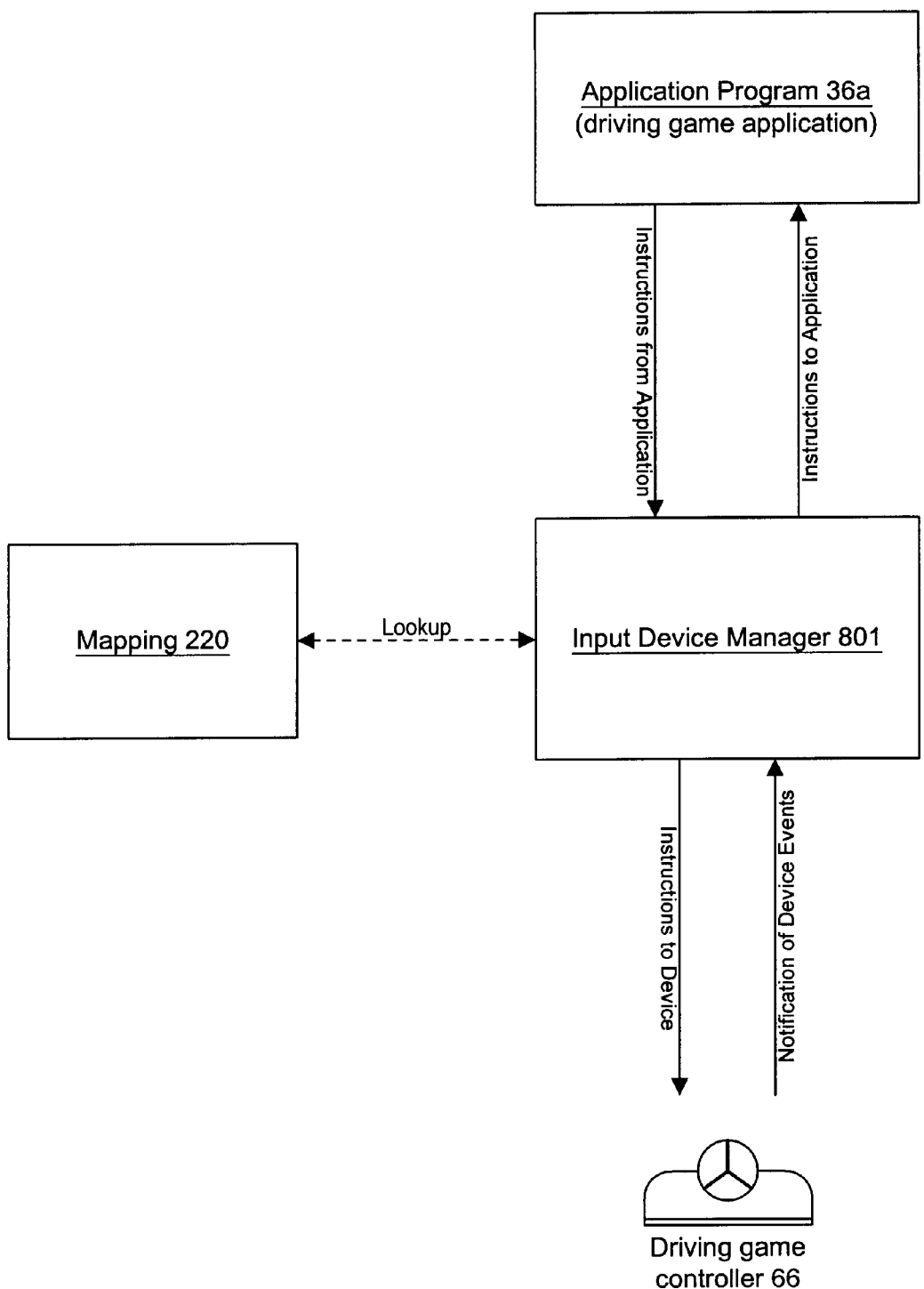
FIG. 8 is a block diagram showing the use of a mapping created by an input device mapping in accordance with aspects of the invention.

Step 704 takes place after steps 703 and 706 have been completed. After input device mapper 39 has received the arrays created at step 702 and the array created at step 705, it creates a mapping, such as mapping 220, by the process described above in the text accompanying FIG. 5. After the mapping has been created, input device mapper 39 may provide mapping information to application program 36*a* at step 704. The mapping information provided may include information about which device control is correlated with each application-defined action. If the mapping is provided to application program 36*a* at step 704, then application program 36*a* can use the mapping to convert notifications of device events into actions that application program 36*a* performs. Alternatively, instead of providing the mapping to application program 36*a*, the mapping may be provided to an input device manager, which is depicted in FIG. 8 and described below, which uses the mapping to translate device event notifications into input for application program 36*a*. In the case where an input device manager is used to translate device event notifications into application program input, it is not necessary to provide the mapping to application program 36*a*, in which case step 704 can be omitted.

Following step 704, application program 36*a* begins its input loop 709, which comprises listening for input at step 707, processing the input at step 708, and returning to step 707 to listen for more input. When the mapping has been provided to application program 36a at step 704, application program 36a can use the mapping to process the input. In this case, application program would receive notification of events on an input device, such as game controller 66, and would use the mapping to look up what actions to perform in response to a given event. Alternatively, when an input device manager is used, as depicted in FIG. 8 and discussed below, the input device manager translates each device event notification into an instruction to application program 36a to perform a particular action. In this case, application program 36a does not perform any lookup into the mapping in processing step 707; it simply follows instructions received from the input device manager.

FIG. 8 shows an input device manager 801, which uses mapping 220 created by input device mapper 39 to provide communication between driving game application 36a and game controller 66. Input device manager 801 operates during execution of an application program, and uses a mapping to translate notification of input device events into commands to the application program. For example, in FIG. 8, input device manager 801 uses mapping 220, which is depicted in FIG. 5, to translate between events on game controller 66 and driving game application 36a. Driving game controller 66 sends input device manager 801 a data item signifying that an event has happened, such as the pressing of the right pedal. Input device manager 801 performs a lookup in mapping 220, and determines that the data received is correlated with the semantic "ACCELERATE," which, in turn, is correlated with the action "speed up." Input device manager 801 then sends into the input stream of driving game application 36a data representing an instruction to perform the "speed up" action.

In addition to providing instructions to driving game application 36a, input device manager 801 may also provide other information including the number of times that a control has been operated, the duration of its operation, a timestamp for the operational event (e.g., button 1 was pressed at time=T1, x-axis was moved to position −32 at time=T2, etc.), or a parameter further describing the device event (e.g., in addition to data signifying that motion along the x-axis has occurred, input device manager 801 may also provide data indicating the magnitude and direction of the motion, or data indicating the resulting position of the control). An application, such as driving game application 36a, may be interested in this information. For example, the firing of a weapon may become more rapid after trigger 1 has been depressed for more than one second. A different game application might cause a pinball cue or a slingshot to be pulled back further the longer a button has been depressed.

Input device manager 801 may receive event notifications from multiple devices, and use the data received from multiple devices to report unified instructions to an application. By doing so, it allows an application to be controlled by various devices while allowing the application to view its input as if it came from a single "unified" device. For example, the auxiliary input used to implement the "change dash display" action correlated with the "DASHBOARD" semantic in driving game 36a could be the "D" key on keyboard 40 (not shown in FIG. 8). Input device manager 801 will receive notification that the "D" key on keyboard 40 has been pressed, and will translate this notification into an instruction to driving game application 36a. The source of the input is transparent to application 36a, which knows only that it has received the instruction to perform the action correlated with the semantic "DASHBOARD." Another possible application of reporting unified instructions from multiple devices is aggregation of devices (e.g., using a joystick 67 with a set of pedals that are physically connected to driving game controller 66). Alternatively, in some circumstances it may be useful for input device manager 801 not to unify the input from multiple devices and to inform application 36a which input device a particular input originated from, for example the case where two joysticks are connected to a computer and used simultaneously for a two-player game. This result can be accomplished by assigning an identifying number to each device and providing a device's identifying number to application 36a along with input generated by that device.

When an application and a device are configured such that the application can instruct the device to perform certain actions, input device manager 801 can also use mapping 220 to convey these instructions from the application to the device. For example, as discussed above, driving game application 36a has a "feedback" instruction, which is mapped to the "vibrate" function on game controller 66 through the semantic "RUMBLE." Input device manager 801 receives the "feedback" instruction from driving game application 36a and uses mapping 220 to send game controller 66 an instruction to vibrate. Game application 36a may provide the instruction to input device manager 801 with a parameter to be communicated to game controller 66, such as the strength with which game controller 66 should vibrate.

A further type of information that might be conveyed to input device manager 801 from an application is the application's context, so that input device manager 801 can change the sense of the controls to match their use in the present phase of the game. For example, driving game 36a may notify input device manager 801 when it has changed from the driving simulation genre to the role-playing genre, so that the use of the controls will be appropriate for the current phase of the game; as another example, a baseball game application may notify the input device manager when it changes from a batting context to a fielding context. Input device manager 801 uses this information to look up the appropriate mapping information for the present context.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Particularly, while the invention has been described in terms of the use of a game controller with a game application, it is in no way limited to game hardware and software; on the contrary, it will be appreciated by those skilled in the art that the invention can be used with all types of software and input hardware. Those skilled in the art, having the benefit of the teachings of this specification, may effect numerous modifications thereto and changes may be made without departing from the scope and spirit of the invention in its aspects.

EXAMPLES

The following are examples of genres that could be used with an input device mapper. The semantics in each genre are divided into "priority 1" semantics and "priority 2" semantics, which are described below:

Genre 1: Combat Driving sim, with weapons

| Semantic | Description |
|---|---|
| Priority 1 Controls | |
| Steer | left/right |
| Accelerate | faster/slower |
| Brake | Brake |
| Weapons | select next weapon |
| Fire | fires selected weapon |
| Target | selects next available target |
| Menu | pause, show menu of priority 2 & 3 controls |
| Priority 2 Controls | |
| Look | forward/right/backward/left |
| View | cycle through view options |
| Device | show device and controls |
| Dashboard | select next dashboard/heads-up display option |
| Press to talk | for voice communication |
| Up shift | select next higher gear |
| Down shift | select next lower gear Reverse from neutral |

Genre 2: Flying Sim, without weapons

| Semantic | Description |
|---|---|
| Priority 1 Controls | |
| Bank | bank ship left/right |
| Climb/dye | pitch up/down |
| Throttle | faster/slower |
| Brake | brake |
| Menu | pause, show menu of priority 2 & 3 controls |
| Priority 2 Controls | |
| Look | forward or up/back or down/left/right |
| Rudder | turn ship left/right |
| View | select next view (in the cockpit, behind plane, etc.) |
| Display | select next on-screen display options, maps, etc. |
| Flaps up | |
| Flaps down | |
| Toggle Gear | Gear up/down |
| Press to talk | voice communication |
| Device | displays input device and controls |

Genre 3: Role Playing

| Semantic | Description |
|---|---|
| Priority 1 Controls | |
| Move | forward/back/left/right |
| Get | pick up and carry item |
| Select Inventory | select next inventory item |
| Apply | use selected inventory item |
| Attack | |
| Cast | cast spell |
| Talk | communicate |
| Crouch | crouch, climb down, swim down |
| Jump | jump, climb up, swim up |
| Menu | pause, show menu of priority 2 & 3 controls |
| Priority 2 Controls | |
| Look | forward or up/back or down/left/right usually maps to point of view ("POV") on devices that have one |
| Map | cycle through map options |

Genre 3: Role Playing -continued

| Semantic | Description |
|---|---|
| Display | shows next on-screen display options, maps, etc. |
| Press to talk | voice communication (multi-player) |
| Rotate | turn body left/right |
| Device | displays input device and controls |

Genre 4: Hunting

| Semantic | Description |
|---|---|
| Priority 1 Controls | |
| Move | move forward/backward/left/right-or-aim up/down/left/right |
| Aim | toggle "Move" axis above between aim and move |
| Fire | fire selected weapon |
| Weapon | select next weapon (cycle through options) |
| Binoculars | look through binoculars |
| Call | make animal call |
| Map | view map |
| Special | do game special operation (raffle, eat) |
| Menu | pause, show menu of priority 2 & 3 controls |
| Priority 2 Controls | |
| Look | forward or up/back or down/left/right usually maps to POV on devices that have one |
| Display | shows next on-screen display options, maps, etc. |
| Press to talk | voice communication (multi-player) |
| Rotate | turn body left/right |
| Crouch | crouch, climb down, swim down |
| Jump | jump, climb up, swim up |
| Device | displays input device and controls |

Genre 5: Real Time Strategy

| Semantic | Description |
|---|---|
| Priority 1 Controls | |
| Scroll | up/down/left/right |
| Select | Select unit/object/item |
| Instruct | cycle through instructions |
| Apply | apply selected instruction |
| Team | select next team (cycle through all) |
| Building | select next building |
| Menu | pause, show menu of priority 2 & 3 controls |
| Priority 2 Controls | |
| Map | cycle through map options |
| Display | shows next on-screen display options, maps, etc |
| Press to talk | voice communication (multi-player) |
| Device | displays input device and controls |

Genre 6: Baseball

| Semantic | Description |
|---|---|
| Priority 1 Controls - batting | |
| Aim | aim where to hit |
| Select | cycle through swing options |
| Normal | normal swing |
| Power | swing for the fence |

-continued

Genre 6: Baseball

| Semantic | Description |
| --- | --- |
| Bunt | bunt |
| Steal | have base runner attempt to steal a base |
| Burst | have base runner invoke burst of speed |
| Slide | have base runner slide into base |
| Box | Enter or exit batting box |
| Menu | pause, show menu of priority 2 & 3 controls |

Priority 2 Controls - batting (none)

Priority 1 Controls - pitching

| Semantic | Description |
| --- | --- |
| Aim | aim where to pitch |
| Select | cycle through pitch selections |
| Pitch In | throw pitch into strike zone |
| Pitch Out | throw pitch outside of strike zone |
| Base | select base to throw to |
| Throw | throw to base |
| Catch | catch hit ball |
| Menu | pause, show menu of priority 2 & 3 controls |

Priority 1 Controls - fielding

| Semantic | Description |
| --- | --- |
| Aim | aim where to run or throw |
| Nearest | switch to fielder nearest to the ball |
| Conservative Throw | make conservative throw |
| Aggressive Throw | make aggressive throw |
| Burst | invoke burst of speed |
| Jump | jump to catch ball |
| Dive | dive to catch ball |
| Menu | pause, show menu of priority 2 & 3 controls |

Priority 2 Controls - fielding (none)

Genre 7: 2D side to side movement

| Semantic | Description |
| --- | --- |
| Priority 1 Controls | |
| Move | left/right/jump or climb or swim up/down |
| Throw | throw object |
| Carry | carry object |
| Attack | attack |
| Special | apply special move |
| Select | select special move |
| Menu | pause, show menu of priority 2 & 3 controls |
| Priority 2 Controls | |
| View | scroll view left/right/up/down usually maps to POV on devices that have one |
| Device | displays input device and controls |

Genre 8: 2D Object Control (CAD)

| Semantic | Description |
| --- | --- |
| Priority 1 Controls | |
| Move | move object or scroll view up/down/left/right |
| View | select between move and scroll |
| Zoom | in/out |
| Select | |
| Special 1 | do first special operation |
| Special 2 | do second special operation |
| Special 3 | do third special operation |
| Special 4 | do fourth special operation |
| Menu | pause, show menu of priority 2 & 3 controls |
| Priority 2 Controls | |
| Rotate Z | rotate object or view clockwise/counterclockwise |
| Display | shows next on-screen display options, etc. |
| Device | displays input device and controls |

Genre 9: Browser Control

| Semantic | Description |
| --- | --- |
| Priority 1 Controls | |
| Pointer | Move on screen pointer |
| Select | Select current item |
| Forward/Back | Move between items akeady seen |
| Page Up/Down | Move view up/down |
| Search | Use search tool |
| Refresh | Refresh |
| Stop | Cease current update |
| Priority 2 Controls | |
| Home | Go directly to "home" location |
| Favorites | Mark current site as favorite |
| Next | Select Next page |
| Previous | Select Previous page |
| History | Show/Hide History |
| Print | Print current page |

We claim:

1. A system for mapping an input device's controls with a computer executable instruction set, comprising:
   a control-semantic set having a control code associated with a control semantic, wherein the control code is representative of the input device control;
   an action-semantic set having an action code associated with an action semantic, wherein the action code is representative of the computer executable instruction set;
   a genre comprising at least one genre semantic and not including the action code or the control code; and
   a map linking the action-semantic set to the control-semantic set by way of the genre, wherein the control semantic and the action semantic share a common genre semantic.

2. The system as recited in claim 1 wherein the genre is selected from a plurality of genres.

3. The system as recited in claim 2, wherein an input device has a first and a second control-semantic set associated with the same control.

4. The system as recited in claim 3, wherein the first control set has a common semantic with a one of said plurality of genres and the second control-semantic set has a common semantic with another one of said plurality of genres.

5. The system according to claim 1, wherein a text string is associated with said action code.

6. The system according to claim 1, further comprising an auxiliary input, wherein said map links an action code to said auxiliary input.

7. The system according to claim 1, where said action-semantic set is represented in an array, and said array comprises an ordered tuple for each action code in said action-semantic set, wherein each said tuple comprises:

a value representing a genre semantic; and an action code representing an instruction to said computer executable instruction set.

8. The system according to claim 7, wherein each of said tuples further comprises a text string describing said action semantic.

9. The system according to claim 1, where said control-semantic set is represented in an array, and said array comprises an ordered tuple for each control code in said control-semantic set, wherein each said tuple comprises:

a value representing a genre semantic; and a control code representing a notification of operating a control on said input device.

10. The system according to claim 1, wherein said map may be modified by a user.

11. The system according to claim 10, further comprising:

a text string describing said action semantic, wherein said text string is provided by said computer executable instruction set;

a bitmap image of said input device with a text field, wherein said text field is filled in with said text string, and wherein said bitmap image with said filled in text field is displayed to a user to permit visual representation of said mapping.

12. A method of providing interaction between a first and a second system, comprising the acts of:

providing a mapping system having a plurality of mapping genres, wherein the mapping genres comprise one or more semantics but do not include codes produced or accepted by either the first system or the second system;

accepting into the mapping system information from the first system indicative of genres with which an action of the first system can interact;

accepting into the mapping system information from the second system indicative of the genres with which an action of the second system can interact; and selecting one of the plurality of mapping genres to provide a link between the action of the first system with the action of the second system, the link being provided by associating input/output codes of the first system with input/output codes of the second system based on the respective input/output codes being associated with a common semantic in the selected genre.

13. The method of claim 12 further comprising the step of publishing the mapping system genres whereby developers of the first system can develop the first system to interact a selected genre so that the first system can interact with any second system that interacts with the selected genre.

14. The method of claim 12 wherein the first system comprises an input/output device.

15. The method of claim 14 wherein the second system comprises a set of computer executable instructions.

16. The method of claim 15 wherein the act of selecting a genre is dependent upon information from said second system.

17. The method of claim 14 further comprising a third system wherein said system accepts mapping information from the third system indicative of genres with which an action of the third system can interact and wherein said mapping system selects a second genre to provide a link between one of the second system genres and the third system by way of the second selected genre.

18. The method of claim 14 further comprising a third system wherein said system accepts mapping information from the third system indicative of genres with which an action of the third system can interacts and wherein said mapping system provides a link between one of the second system genres and the third system by way of the selected genre.

19. The method of claim 18, wherein said selected genre comprises a first semantic and a second semantic, and wherein the link between said first and second systems is provided by way of said first semantic, and the link between said second and third systems is provided by way of said second semantic.

20. The method of claim 19, wherein said first semantic has a first priority and said second semantic has a second priority, and wherein said mapping system links said third system to said second system based on said second priority.

21. A method for using computer input devices with a computer software application, the method comprising:

receiving a correlation between a set of actions that said software application performs and semantics selected from a genre, the genre comprising said semantics but not including commands interpretable by the computer software application;

receiving a correlation between controls on a first input device and semantics selected from said genre;

receiving a correlation between controls on a second input device and semantics selected from said genre;

selecting an input device from among said first input device and said second input device; and creating a mapping of controls on said selected device into said set of actions, such that at least one of said controls on said selected device maps to an action from said set of actions where said control and said action are correlated with a common semantic.

22. The method of claim 21, wherein the act of selecting an input device comprises:

locating input devices in a sequence; and selecting the first of said input devices located.

23. The method of claim 21, wherein the act of selecting an input device comprises:

looking up preferred devices in a database containing a list of preferred devices for said genre; and selecting a device on said list.

24. A computer-readable medium containing computer-executable instructions to perform a method for using computer a computer input device with a software application, the method comprising:

receiving a correlation between action codes that said software application accepts as instructions and semantics selected from a genre, the genre comprising said semantics but not including said action codes;

receiving a correlation between control codes that said input device generates and semantics selected from said genre; and creating a mapping of said control codes into said action codes, such that at least one control code maps to an action code where said control code and said action code are correlated with a common semantic.

25. The computer-readable medium according to claim 24, said method further comprising:

receiving a control code from said input device, wherein said control code signifies that a control on said device has been operated, and wherein said control code uniquely identifies the control that has been operated;

looking up said control code in said mapping to determine an action code to be sent to the input stream of said software application; and sending said action code to said software application.

26. A method for using a computer input devices with a software application, the method comprising:

receiving a correlation between a first set of action codes that said software application accepts as instructions and semantics selected from a first genre, the first genre comprising said semantics but not including said first set of action codes;

receiving a correlation between a second set of action codes that said software application accepts as instructions and semantics selected from a second genre, the second genre comprising said semantics but not including said second set of action codes;

receiving a correlation between a first set of control codes that said input device generates and semantics selected from said first genre;

receiving a correlation between a second set of control codes that said input device generates and semantics selected from said second genre;

creating a first mapping of said first set of control codes into said first set of action codes, such that at least one control code maps to an action code where said control code and said action code are correlated with a common semantic; and creating a second mapping of said second set of control codes into said second set of action codes, such that at least one control code maps to an action code where said control code and said action code are correlated with a common semantic.

27. The method of claim 26, further comprising:

receiving a first control code from said input device, where said first control code signifies that a first control on said input device has been operated, and where said first control code uniquely identifies said first control;

looking up said first control code in said first mapping to determine a first action code to be sent to the input stream of said software application;

sending said first action code to said software application;

receiving from said software application notification of a change of context in said software application from said first genre to said second genre;

receiving a second control code from said second input device, where said second control code signifies that a second control on said input device has been operated, and where said second control code uniquely identifies said second control;

looking up said second control code in said second mapping to determine a second action code to be sent to the input stream of said software application; and sending said second action code to said software application.

* * * * *